US008334887B2

(12) United States Patent
Gentner et al.

(10) Patent No.: US 8,334,887 B2
(45) Date of Patent: Dec. 18, 2012

(54) APPARATUS AND METHOD FOR DETERMINING BEAM DELAYS IN A PRINTING DEVICE

(75) Inventors: Jess R. Gentner, Rochester, NY (US); Martin J. Pepe, West Henrietta, NY (US); Timothy J. Clark, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 292 days.

(21) Appl. No.: 12/731,601

(22) Filed: Mar. 25, 2010

(65) Prior Publication Data

US 2011/0234737 A1 Sep. 29, 2011

(51) Int. Cl.

*B41J 2/435* (2006.01)
*B41J 2/47* (2006.01)
*B41J 2/455* (2006.01)
*G01D 15/14* (2006.01)

(52) U.S. Cl. ........ 347/235; 347/224; 347/225; 347/233; 347/250

(58) Field of Classification Search .................. 347/235, 347/250
See application file for complete search history.

(56) References Cited

U.S. PATENT DOCUMENTS

| | | | | |
|---|---|---|---|---|
| 5,485,195 | A | 1/1996 | Nacman | |
| 5,750,986 | A | 5/1998 | Genovese | |
| 5,844,591 | A | 12/1998 | Takamatsu et al. | |
| 6,456,309 | B1 | 9/2002 | Panides et al. | |
| 7,224,378 | B2 * | 5/2007 | Maeda | 347/235 |
| 7,652,682 | B2 * | 1/2010 | Ushio | 347/235 |
| 2005/0157160 | A1 | 7/2005 | Vazan | |
| 2007/0046769 | A1 * | 3/2007 | Park et al. | 347/235 |
| 2009/0160928 | A1 | 6/2009 | Loce et al. | |
| 2009/0244252 | A1 | 10/2009 | Kleckner et al. | |

* cited by examiner

*Primary Examiner* — Laura Martin
*Assistant Examiner* — Jeremy Bishop
(74) *Attorney, Agent, or Firm* — Ronald E. Prass, Jr.; Prass LLP

(57) ABSTRACT

An apparatus (100) and method (200) that determines beam delays in a printing device is disclosed. The apparatus can include a photosensitive surface (110) and a raster output scanner (120) optically coupled to the photosensitive surface, an integrated scan detector (130) configured to detect the beams from the raster output scanner and configured to produce a signal based on the beams detected from the raster output scanner, and a beam calibration controller (140) coupled to the integrated scan detector. The beam calibration controller can be configured to determine at least one beam delay between the first optical emitter and the at least one second optical emitter based on signals from the integrated scan detector and can also be configured to delay operation between the first optical emitter and the at least one second optical emitter based on the at least one beam delay.

18 Claims, 5 Drawing Sheets

APPARATUS AND METHOD FOR DETERMINING BEAM DELAYS IN A PRINTING DEVICE

BACKGROUND

Disclosed herein is an apparatus and method that determines beam delays in a printing device.

Presently, electrophotographic marking is a method of copying or printing documents in a printing system. Electrophotographic marking exposes a substantially uniformly charged photosensitive surface of a photoreceptor to an optical light image of an original document. The photoreceptor is discharged to create an electrostatic latent image of the original document on the photoreceptor's surface. Toner is then selectively adhered to the latent image. The resulting toner pattern is transferred from the photoreceptor either directly to a marking substrate such as a sheet of paper or indirectly to a marking substrate after an intermediate transfer step. The transferred toner powder image is subsequently fused to the marking substrate using heat and/or pressure to make the image permanent. Finally, the surface of the photoreceptor is cleaned of residual materials and recharged in preparation for the creation of another image.

A raster output scanner is one system commonly used for electrophotographic marking. A raster output scanner includes at least one optical emitter, such as a laser beam source. A raster output scanner also includes a means for modulating the resulting laser beam, which, as in the case of a laser diode, may be the action of turning the source itself on and off, such that the laser beam contains image information. A raster output scanner further includes a rotating polygon mirror having one or more reflective surfaces and other optics, such as pre-polygon optics for collimating the laser beam, post-polygon optics for focusing the laser beam into a well-defined spot on the photoreceptor surface and for compensating for a mechanical error known as polygon wobble, and one or more folding mirrors to reduce the overall physical size of the scanner housing. The laser source, modulator, and pre-polygon optics produce a collimated laser beam which is directed to the reflective polygon facets. As the polygon rotates, the reflected beam passes through the post-polygon optics and is redirected by folding mirrors to produce a focused spot that sweeps along the surface of the charged photoreceptor. Since the photoreceptor moves in a process direction that is substantially perpendicular to the scan line, the spot sweeps the photoreceptor surface in a raster pattern. By suitably modulating the laser beam in accordance with the position of the spot, a desired latent image can be produced on the photoreceptor.

Some raster output scanners employ more than one laser beam. Multiple laser beam systems are advantageous in that higher overall process speeds can result if the individual laser beams expose the raster scan lines in parallel at a given resolution, or higher resolution can be provided if the individual laser beams expose multiple raster scan lines at the same process speed. Typically, raster output scanners that employ multiple optical emitters have a parallel path architecture with closely spaced beams. Closely spaced laser beams are beneficial in that they can be arranged to share common optical components including the same polygon facets, the same post-polygon lens, and the same mirror system. This tends to minimize relative misalignment errors caused by manufacturing differences in the optical components.

A phenomenon known as scan line jitter exists in electrophotographic printing. Scan line jitter refers to the failure of pixels in successive scan lines of the raster to be precisely aligned with each other. For example, jitter is a dysfunction, or mis-position noise, of not placing a pixel in the correct position on the photoreceptor surface to create a straight line. To help reduce scan line jitter it is common to position a photodetector element in the scan line path just ahead of the latent image area in order to establish accurate data clock phasing on successive scans, a technique generally referred to as start-of-scan detection. When a laser beam crosses the photodetector, a fast start-of-scan transition or edge is produced which is used to initialize the pixel clock controlling the phase of the data stream that modulates the laser beam.

One problem with using multiple optical sources occurs because the sources, while closely spaced, still cannot be in the same physical location. Because the sources must be located next to each other, their output video must be delayed on a per diode basis for proper alignment, such as in order to form a vertical line on the photoreceptor. If the output video is not delayed properly, the sources will not produce a proper image on the photoreceptor.

Thus, there is a need for an apparatus and method that determines beam delays in a printing device.

SUMMARY

An apparatus and method that determines beam delays in a printing device is disclosed. The apparatus can include a photosensitive surface and a raster output scanner optically coupled to the photosensitive surface. The raster output scanner can include a first optical emitter configured to scan a first beam across the photosensitive surface and at least one second optical emitter configured to scan a second beam across the photosensitive surface to form an image on the photosensitive surface. The apparatus can include an integrated scan detector configured to detect the beams from the raster output scanner and configured to produce a signal based on the beams detected from the raster output scanner. The apparatus can include a beam calibration controller coupled to the integrated scan detector. The beam calibration controller can be configured to determine at least one beam delay between the first optical emitter and the at least one second optical emitter based on signals from the integrated scan detector. The beam calibration controller can be configured to delay operation between the first optical emitter and the at least one second optical emitter based on the at least one beam delay.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
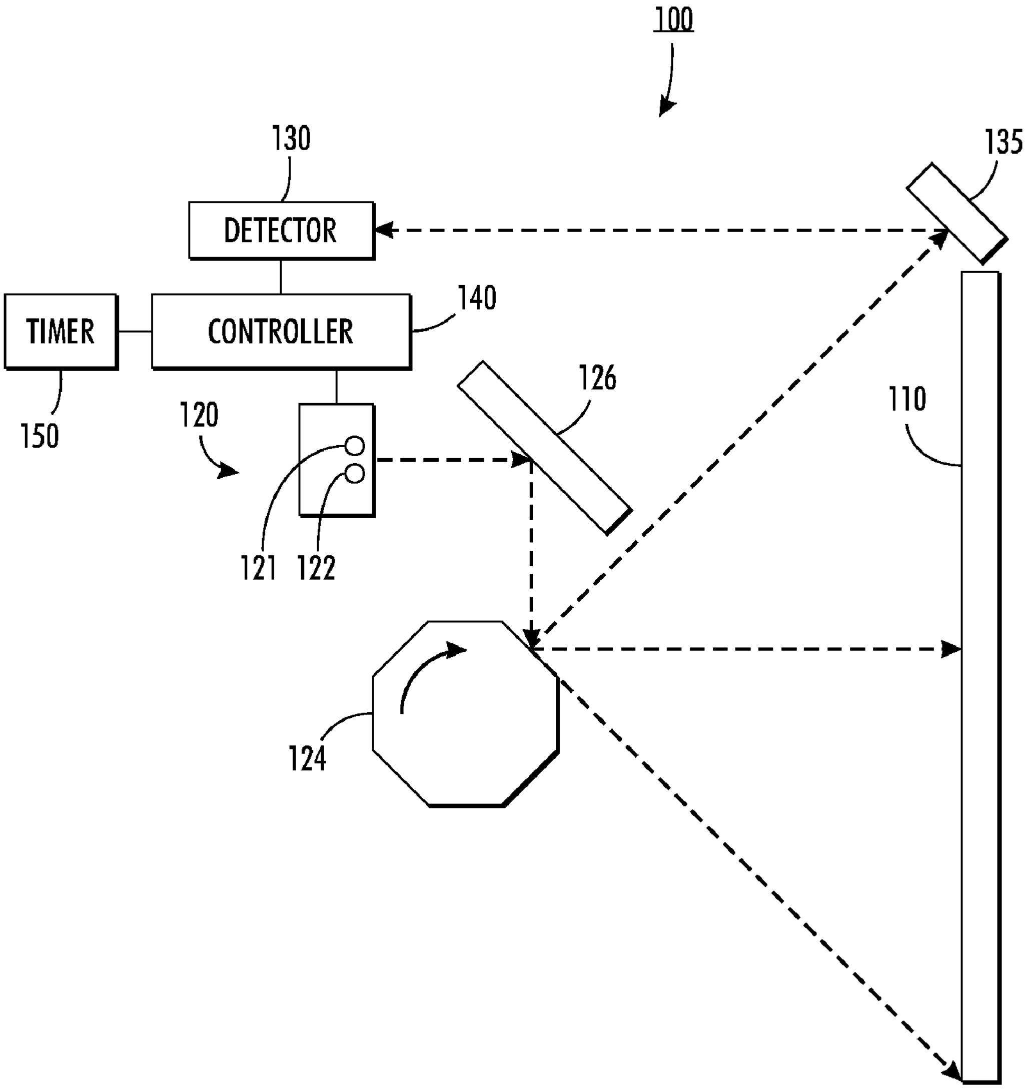
FIG. 1 is an exemplary illustration of an apparatus, such as an image forming apparatus, according to a possible embodiment.

The embodiments include an apparatus for determining beam delays in a printing device. The apparatus can include a photosensitive surface and a raster output scanner. The raster output scanner can include a first optical emitter configured to scan a first beam across the photosensitive surface and at least one second optical emitter configured to scan a second beam across the photosensitive surface to form an image on the photosensitive surface. The apparatus can include an integrated scan detector configured to detect the beams from the raster output scanner and configured to produce a signal based on the beams detected from the raster output scanner. The apparatus can include a beam calibration controller coupled to the integrated scan detector. The beam calibration controller can be configured to determine at least one beam delay between the first optical emitter and the at least one second optical emitter based on signals from the integrated scan detector. The beam calibration controller can be configured to delay operation between the first optical emitter and the at least one second optical emitter based on the at least one beam delay.

The embodiments further include a method of determining beam delays in a printing device having a photosensitive surface, an integrated scan detector, a beam calibration controller, and a raster output scanner. The raster output scanner can have a first optical emitter and at least one second optical emitter. The method can include scanning a first beam from the first optical emitter across the photosensitive surface. The method can include scanning a second beam from the at least one second optical emitter across the photosensitive surface. The method can include detecting, by the integrated scan detector, the first beam from the first optical emitter and the second beam from the at least one second optical emitter. The method can include producing a signal based on the beams detected from the raster output scanner by the integrated scan detector. The method can include determining, by the beam calibration controller, at least one beam delay between the first optical emitter and the at least one second optical emitter based on signals from the integrated scan detector. The method can include delaying operation between the first optical emitter and the at least one second optical emitter based on the at least one beam delay.

The embodiments further include an apparatus for determining beam delays in a printing device. The apparatus can include a photosensitive surface and a raster output scanner optically coupled to the photosensitive surface. The raster output scanner can include a first optical emitter configured to scan a first beam across the photosensitive surface to form an image on the photosensitive surface. The raster output scanner can include a plurality of second optical emitters. The plurality of second optical emitters can include at least one second optical emitter configured to scan a second beam across the photosensitive surface to form an image on the photosensitive surface. The apparatus can include an integrated scan detector configured to detect the beams from the raster output scanner and configured to produce a signal based on the beams detected from the raster output scanner. The apparatus can include a beam calibration controller coupled to the integrated scan detector. The beam calibration controller can be configured to determine at least one beam delay between the first optical emitter and the at least one second optical emitter by operating the raster output scanner to illuminate the integrated scan detector with the first beam from the first optical emitter, receiving a first signal from the integrated scan detector corresponding to the integrated scan detector detecting the first beam, operating the raster output scanner to illuminate the integrated scan detector with the second beam from a second optical emitter of the plurality of second optical emitters, receiving a second signal from the integrated scan detector corresponding to the integrated scan detector detecting the second beam, and determining at least one beam delay for the second optical emitter based on timing between receiving the first signal from the integrated scan detector and receiving the second signal from the integrated scan detector. The beam calibration controller can be configured to delay operation between the first optical emitter and the second optical emitter based on the at least one beam delay.

FIG. 1 is an exemplary illustration of an apparatus 100, such as an image forming apparatus, according to a possible embodiment. The apparatus 100 may be or may be part of a printer, a multifunction media device, a xerographic machine, an ink jet printer, a copier, or any other device that produces an image on media. The apparatus 100 can include a photosensitive surface 110. The photosensitive surface 110 can be an image production photosensitive surface, a photoreceptor drum surface, a photosensitive belt surface, multiple photoreceptor surfaces, or any other photosensitive surface that can be used for image production. For example, the photosensitive surface 110 shown can be a cutaway section of a surface of a photoreceptor belt that can move in a direction out of the illustration. The apparatus 100 can include a raster output scanner 120. The raster output scanner 120 can be optically coupled to the photosensitive surface 110 by directing beams to the photosensitive surface 110 where the dotted lines can represent beams at different times. The raster output scanner 120 can include a first optical emitter 121 configured to scan a first beam across the photosensitive surface 110 and at least one second optical emitter 122 configured to scan a second beam across the photosensitive surface 110 to form an image on the photosensitive surface 110. The terms first optical emitter and second optical emitter are relative and may each refer to any optical emitter among a plurality of optical emitters in a raster output scanner. For example, the raster output scanner 120 can include a plurality of laser emitters configured to scan a plurality of laser beams across the photosensitive surface 110 to form an image on the photosensitive surface 110. The optical emitters 121 and 122 can be lasers, vertical cavity surface emitting laser emitters, diodes, or any other optical emitters that can produce an image on a photosensitive surface. As a further example, the raster output scanner 120 can include a plurality of vertical cavity surface emitting lasers arranged in an array. The first optical emitter 121 can be a first vertical cavity surface emitting laser and the at least one second optical emitter 122 can be at least one second vertical cavity surface emitting laser.

The apparatus 100 can include an integrated scan detector 130 configured to detect the beams from the raster output scanner 120 and configured to produce a signal based on the beams detected from the raster output scanner 120. The integrated scan detector 130 can produce a start-of-scan signal, can produce an end of scan signal, can produce an edge of scan signal that can be a start-of-scan signal or an end of scan signal, or can produce any other signal in between. For example, the integrated scan detector 130 can detect beams at either end of the photosensitive surface 110 or elsewhere in the apparatus 100 depending on the placement of the integrated scan detector 130.

The apparatus 100 can include a controller, such as a beam calibration controller 140, coupled to the integrated scan detector 130. The beam calibration controller 140 can be part of an apparatus controller, can be an autonomous controller, can include software, can include hardware, can include a combination of software and hardware, or can be any other controller useful in a printing apparatus. The beam calibration controller 140 can be configured to determine at least one beam delay between the first optical emitter 121 and the at least one second optical emitter 122 based on signals from the integrated scan detector 130. The beam calibration controller 140 can also be configured to delay operation between the first optical emitter 121 and the at least one second optical emitter 122 based on the at least one beam delay.

For example, multiple optical emitters may or may not be in a linear vertical orientation. In some cases they can comprise a two dimensional array. A beam direction assembly 124 can direct beams from all of the optical emitters across the photosensitive surface 110 at the same speed, and can image whatever shape the optical emitters are arranged in or can offset the beams by using beam delays. To elaborate, while there are individual beams, they may not scan at independent rates. Because the optical emitters cannot be in the exact same physical location, when a vertical line is to be drawn, not all beams are over the correct spot at the very same instant in time, as they may be offset in the scanning direction, as well as offset in other directions. By adding a video delay to a beam that is offset in the scanning direction relative to an earlier beam, the information from the later beam can be delayed until it is in the correct position, such as over the right spot for drawing the vertical line. The same procedure can be used for any image on the photosensitive surface 110. Also, this concept can be applicable to any number of a plurality of beams.

The beam calibration controller 140 can be configured to alternately trigger the integrated scan detector 120 between the first optical emitter 121 as a reference first optical emitter and one of the at least one second optical emitter 122 to determine at least one beam delay between the first optical emitter and the at least one second optical emitter. For example, the beam calibration controller 140 can be configured to alternately trigger the integrated scan detector 120 between the first optical emitter 121 as the reference first optical emitter and another of the at least one second optical emitter 122 to determine a second beam delay for the another of the at least one second optical emitter 122.

The beam calibration controller 140 can be configured to determine the at least one beam delay by performing a delay determination operation. The delay determination operation can include operating the raster output scanner 120 to illuminate the integrated scan detector 130 with the first beam from the first optical emitter 121. The delay determination operation can include receiving a first signal from the integrated scan detector 130 corresponding to the integrated scan detector 130 detecting the first beam. The delay determination operation can include operating the raster output scanner 120 to illuminate the integrated scan detector 130 with the second beam from a second optical emitter of the at least one second optical emitter 122. The delay determination operation can include receiving a second signal from the integrated scan detector 130 corresponding to the integrated scan detector 130 detecting the second beam. The delay determination operation can include determining the at least one beam delay based on timing between receiving the first signal from the integrated scan detector 130 and receiving the second signal from the integrated scan detector 130. The beam calibration controller 140 can use a clock, can use an interval counter, or can use any other timing device or method to determine timing between receiving the first signal from the integrated scan detector 130 and receiving the second signal from the integrated scan detector 130. The beam calibration controller 140 can perform the delay determination operation multiple times to receive multiple samples to determine the at least one beam delay for one optical emitter. The beam calibration controller 140 can also perform the delay determination operation for multiple pairs of optical emitters to determine the beam delay for additional optical emitters.

The beam calibration controller 140 can also be configured to determine the at least one beam delay by performing a delay determination operation that can include illuminating the integrated scan detector 130 with the first beam. The delay determination operation can include scanning the first beam across the photosensitive surface 110 until the first beam subsequently illuminates the integrated scan detector 130. The delay determination operation can include determining a first time interval between the illumination and the subsequent illumination of the integrated scan detector 130 by the first beam. The delay determination operation can include scanning the second beam across the photosensitive surface 110 until the second beam illuminates the integrated scan detector 130. The delay determination operation can include determining a second time interval between the subsequent illumination of the integrated scan detector 130 by the first beam and the illumination of the integrated scan detector 130 by the second beam. The delay determination operation can include determining the at least one beam delay based on a difference between the first time interval and the second time interval. Multiple intervals can be determined for both subsequent illuminations by the first beam and illuminations between the first beam and the second beam to obtain average time intervals and to reduce noise. The intervals can also be determined from one scan line or multiple scan lines.

The apparatus 100 can include a beam direction assembly 124. The beam direction assembly 124 can be a motor polygon assembly, a rotating polygon, a scanner motor, a rotating mirror, or any other structure used to direct a beam. For example, the raster output scanner 120 can include a rotating polygon 124 coupled between the optical emitters 121 and 122 and the photosensitive surface 110. The rotating polygon 124 can be configured to sweep the plurality of beams across the photosensitive surface 110. The apparatus 100 can also include mirrors 126 and 135 and can include other mirrors and focusing elements for directing and focusing the beams from the raster output scanner 120.

The beam calibration controller 140 can be configured to determine at least one beam delay based on a formula including at least:

$$d_i = \frac{\sum_{j=1}^{N} \Delta c_{i,j} \cdot T_{CLK} \cdot f_{pix}}{N}$$

where i can be a beam interval index corresponding to the total number of optical emitters, where $d_i$ can be the delay corresponding to an $i^{th}$ optical emitter, where N can be a number of samples, where $\Delta c_{i,j}$ can be a difference between a time interval for the first beam and a time interval for an $i^{th}$ beam for the $j^{th}$ sample of the N number of samples, where $T_{CLK}$ can be an interval clock period, and where $f_{pix}$ can be a pixel frequency for a given beam direction assembly speed.

The apparatus 100 can include an interval timer 150 configured to count a number of interval timer cycles between the beams based on the signal from the integrated scan detector 130. For example, the term $\Delta c$ can indicate a difference between scan intervals. The interval clock period can be units of time for each count of each $\Delta c_{i,j}$. The beam calibration controller 140 can be configured to determine at least one beam delay between the first optical emitter 121 and the at least one second optical emitter 122 based on the number of interval timer cycles between the beams.

According to a related embodiment, the apparatus 100 can include a photosensitive surface 110 and a raster output scanner 120 optically coupled to the photosensitive surface 110. The raster output scanner 120 can include a first optical emitter 121 configured to scan a first beam across the photosensitive 110 surface to form an image on the photosensitive surface 110. The raster output scanner 120 can include a plurality of second optical emitters that can include at least one second optical 122 emitter configured to scan a second beam across the photosensitive surface 110 to form an image on the photosensitive surface 110. The apparatus 100 can include an integrated scan detector 130 configured to detect the beams from the raster output scanner 120 and configured to produce a signal based on the beams detected from the raster output scanner 120. The apparatus 100 can include a beam calibration controller 140 coupled to the integrated scan detector 130. The beam calibration controller 140 can be configured to determine at least one beam delay between the first optical emitter 121 and the at least one second optical emitter by operating the raster output scanner 120 to illuminate the integrated scan detector 130 with the first beam from the first optical emitter 121, receiving a first signal from the integrated scan detector 130 corresponding to the integrated scan detector 130 detecting the first beam, operating the raster output scanner 120 to illuminate the integrated scan detector 130 with the second beam from a second optical emitter 122 of the plurality of second optical emitters, receiving a second signal from the integrated scan detector 130 corresponding to the integrated scan detector detecting the second beam, and determining at least one beam delay for the second optical emitter 122 based on a time between receiving the first signal from the integrated scan detector 130 and receiving the second signal from the integrated scan detector 130. The beam calibration controller 140 can be configured to delay operation between the first optical emitter 121 and the second optical emitter 122 based on the at least one beam delay. The beam calibration controller 140 can also be configured to alternately trigger the integrated scan detector 120 between pairings of the first optical emitter 121 as a reference optical emitter and others of the plurality of the second optical emitters to determine a beam delay for each of the plurality of the second optical emitters.

Figure 2:
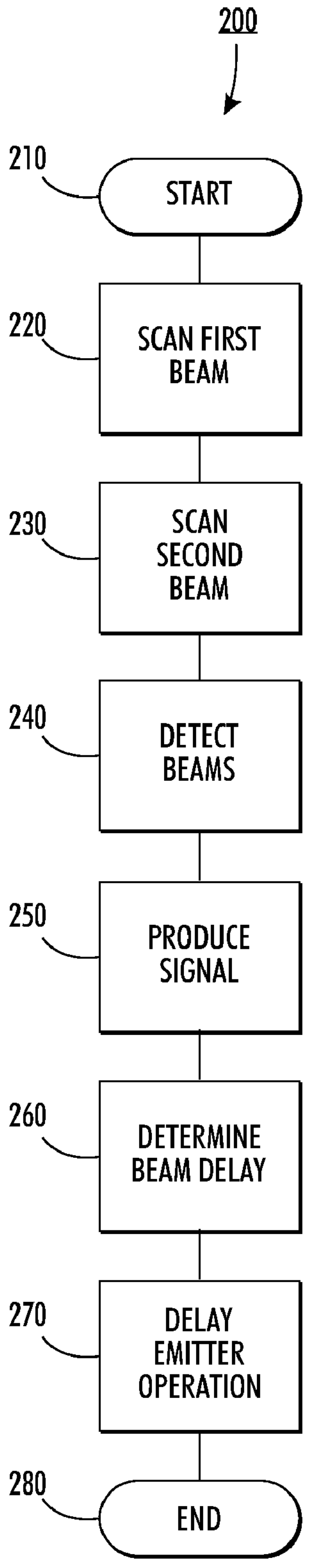
FIG. 2 illustrates an exemplary flowchart of a method of determining beam delays in an apparatus according to a possible embodiment.

FIG. 2 illustrates an exemplary flowchart 200 of a method of determining beam delays in an apparatus including a photosensitive surface, an integrated scan detector, a beam calibration controller, and a raster output scanner according to a possible embodiment. The raster output scanner can include a first optical emitter and at least one second optical emitter. The apparatus can also include a beam direction assembly. The method can start at 210. At 220, a first beam from the first optical emitter can be scanned across the photosensitive surface. At 230, a second beam from the at least one second optical emitter can be scanned across the photosensitive surface. At 240, the first beam from the first optical emitter and the second beam from the at least one second optical emitter can be detected by the integrated scan detector. The different beams can be detected by the integrated scan detector at different times. At 250, the integrated scan detector can produce a signal based on the beams detected from the raster output scanner. The integrated scan detector can produce different signals for different beams.

At 260, the beam calibration controller can determine at least one beam delay between the first optical emitter and the at least one second optical emitter based on signals from the integrated scan detector. For example, the integrated scan detector can alternately be triggered between the first optical emitter as a reference first optical emitter and one of the at least one second optical emitter from blocks 220 and 230 to determine the at least one beam delay. Also, the integrated scan detector can alternately be triggered between the first optical emitter as a reference first optical emitter and another of the at least one second optical emitter from blocks 220 and 230 to determine the at least one beam delay for the another of the at least one second optical emitter. The beam calibration controller can determine at least one beam delay by operating the raster output scanner to illuminate the integrated scan detector with the first beam from the first optical emitter, by receiving a first signal from the integrated scan detector corresponding to the integrated scan detector detecting the first beam, by operating the raster output scanner to illuminate the integrated scan detector with the second beam from a second optical emitter of the at least one second optical emitter, by receiving a second signal from the integrated scan detector corresponding to the integrated scan detector detecting the second beam, and by determining the at least one beam delay based on timing between receiving the first signal from the integrated scan detector and receiving the second signal from the integrated scan detector. The beam calibration controller can also determine at least one beam delay by operating the raster output scanner to illuminate the integrated scan detector with the beams and by receiving the signals from the integrated scan detector a plurality of times to receive multiple samples to determine the at least one beam delay. The beam calibration controller can also determine at least one beam delay by illuminating the integrated scan detector with the first beam, by scanning the first beam across the photosensitive surface until the first beam subsequently illuminates the integrated scan detector, by determining a first time interval between the illumination of the integrated scan detector by the first beam and the subsequent illumination of the integrated scan detector by the first beam, by scanning the second beam across the photosensitive surface until the second beam illuminates the integrated scan detector, by determining a second time interval between the subsequent illumination of the integrated scan detector by the first beam and the illumination of the integrated scan detector by the second beam, and by determining the at least one beam delay based on a difference between the first time interval and the second time interval.

The beam calibration controller can determine the at least one beam delay based on a formula including at least:

$$d_i = \frac{\sum_{j=1}^{N} \Delta c_{i,j} \cdot T_{CLK} \cdot f_{pix}}{N}$$

where i can be a beam interval index corresponding to the total number of optical emitters, where $d_i$ can be the delay corresponding to an $i^{th}$ optical emitter, where N can be a number of samples, where $\Delta c_{i,j}$ can be a difference between a time interval for the first beam and a time interval for an $i^{th}$ beam for the $j^{th}$ sample of the N number of samples, where $T_{CLK}$ can be an interval clock period, and where $f_{pix}$ can be a pixel frequency for a given beam direction assembly speed.

At 270, operation between the first optical emitter and the at least one second optical emitter can be delayed based on the at least one beam delay. At 280, the method can end.

According to some embodiments, all of the blocks of the flowchart 200 are not necessary. Additionally, the flowchart 200 or blocks of the flowchart 200 may be performed numerous times, such as iteratively. For example, the flowchart 200 may loop back from later blocks to earlier blocks. Furthermore, many of the blocks can be performed concurrently or in parallel processes.

Some embodiments can provide a method and/or apparatus to determine video delays to sub-pixel resolution for a vertical cavity surface emitting laser array based raster output scanner using feedback from a start-of-scan detector. For example, a start-of-scan detector can be an integral part of a raster output scanner and can be used to determine beam delays. The start-of-scan detector can alternately be triggered by pairings of two diodes, such as two optical emitters. The pairings can consist of a reference diode, common in all pairings, and one of the other laser diodes in a laser diode optical emitter array. A free running oscillator can be used to clock an interval timer that can count a number of cycles between start-of-scan triggers. Multiple intervals can be captured and used to derive the delay from the reference diode to the other diodes in the array.

Figure 3:
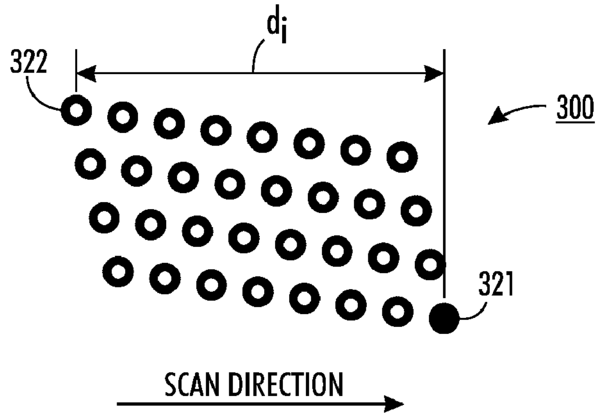
FIG. 3 is an exemplary illustration of an optical emitter array according to a possible embodiment.

FIG. 3 is an exemplary illustration of an optical emitter array 300 according to a possible embodiment. The optical emitter array 300 can have 32 optical emitters including a first optical emitter 321 and at least one second optical emitter 322. The optical emitter array 300 can be a laser diode array that has laser diodes arranged in a parallelogram grid. Other groups of optical emitters may be used. For example, a raster output scanner may include two or more optical emitters and the optical emitters may be arranged in other configurations. When using two or more optical emitters, it can be useful to delay video for each beam by an amount, $d_i$, in order for all beams in the array 300 to start imaging at the same offset along a scan direction. Depending on the optical emitter group geometry, rotation, mounting, and optical characteristics of a raster output scanner, each optical emitter or beam may require a unique amount of delay relative to one of the other optical emitters. For example, the first beam to cross a start of imaging for a photosensitive surface can occur $d_0$ units before a last beam to cross the start of imaging. Depending on the mechanical limitations and the required beam placement resolution, a unique table of delays can be created and stored for each optical emitter based on sensed beams.

To determine the beam delays, a video test pattern can be used to generate video pulses for each beam and the pulses are then aligned by delaying the individual beams. The amount of delay used for each beam can be recorded and stored in a non-volatile memory on the raster output scanner, in the electronic image path, or elsewhere in a printing apparatus. According to one example, an electronic image path, such as circuitry in a controller, for the raster output scanner can synchronize delivery of video for each scan to a start-of-scan signal received from the raster output scanner. The start-of-scan signal can be generated by a sensor placed in the raster output scanner image plane, just before the starting location of a video phase. The electronic image path can control which beam is used to illuminate the sensor and when to turn it on and off. During operation, the electronic image path can monitor the period of start-of-scan pulses and can turn a chosen beam on and off at the proper time to illuminate the start-of-scan sensor. Once the sensor generates a pulse, the beam used to illuminate it can be turned off and the video phase of the scan can begin shortly thereafter.

Figure 4:
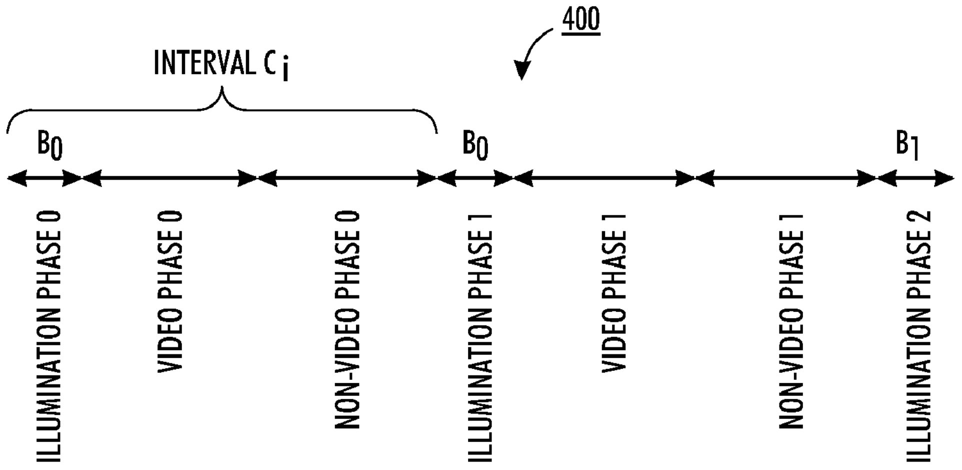
FIG. 4 is an exemplary timeline of toggling of beams to illuminate an integrated scan detector according to a possible embodiment.

FIG. 4 is an exemplary timeline 400 of toggling of beams to illuminate an integrated scan detector, such as a start-of-scan sensor, according to a possible embodiment. The timeline 400 can illustrate several start-of-scan periods, their subcomponents, and the toggling of which beam is used to illuminate a start-of-scan sensor. For example, a beam calibration controller can be used conjunction with an integral start-of-scan sensor to determine the beam delays. An alignment mode can be used to toggle the illumination of the start-of-scan sensor between two beams. The first illumination phase can use a reference beam $b_0$, common to all pairings, and the second can use a target beam $b_i$, which may be any one of the beams from a plurality of optical emitters. As a further example, a reference beam $b_0$ can start a first illumination phase 0 by illuminating an integrated scan detector. The reference beam $b_0$ can scan across a photosensitive surface during a video phase 0 and a non-video phase 0. The reference beam $b_0$ can then illuminate an integrated scan detector at illumination phase 1 and a reference interval $c_i$ can be determined. A second beam $b_1$ can then be used for a subsequent video phase, non-video phase, and illumination phase to determine an interval between the reference beam and the second beam.

Figure 5:
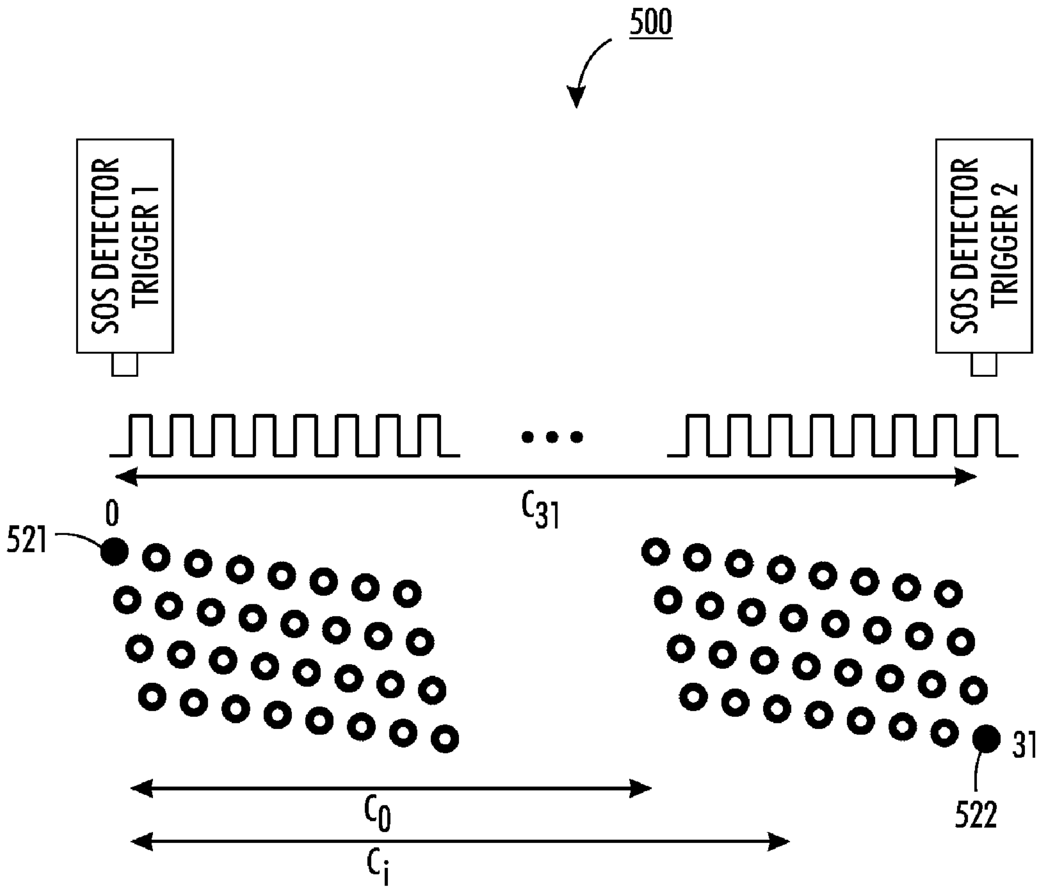
FIG. 5 is an exemplary illustration of an interval from the reference beam to an arbitrary target beam.

FIG. 5 is an exemplary illustration 500 of an interval from the reference beam 521 to an arbitrary target beam 522. A time interval, $c_i$, from a start-of-scan pulse generated during the reference pass to a start-of-scan pulse of the target pass can be measured and recorded. For example, a number of clock cycles, CLK, can be used to determine an interval from a first trigger of a start-of-scan detector to a second trigger of a start-of-scan detector. As a further example, a first optical emitter 521 can trigger a start-of-scan detector a first time and the first optical emitter 521 can trigger the same start-of-scan detector a second time after an interval $c_0$ to set a reference interval. Also, a first optical emitter 521 can trigger a start-of-scan detector a first time and a second at least one second optical emitter 522 can trigger the same start-of-scan detector a second time after an interval $c_{31}$. The interval $c_{31}$ can be compared with the interval $c_0$ to determine the delay required for the second at least one second optical emitter 522. Multiple samples can be made using the same pairing to increase measurement precision and reduce the effect of noise. The measured interval can be converted into the proper unit of measure that is needed for the beam delays. For some embodiments, a vertical cavity surface emitting laser raster output scanner can have delays specified in quarter pixel increments. This procedure can be repeated for each beam in the array in order to generate the full table of beam delays.

As a further example of a delay determination procedure, in a first step, a counter, i, can be set to zero. In a second step, an integrated scan detector can be illuminated with reference beam $b_0$. A controller can receive a corresponding trigger from the integrated scan detector and can reset and start an interval counter, $c_i$. In a third step, the integrated scan detector can be illuminated with a beam $b_i$. The controller can receive the corresponding trigger and increase the counter i for the current count interval $c_i$. The second and third steps can be repeated until sufficient samples are received. In a fourth step, the resulting interval(s) can be stored. In a fifth step, the counter i can be incremented and the previous steps 3-5 can be repeated. The beam delays can then be computed as described in the embodiments above.

Figure 6:
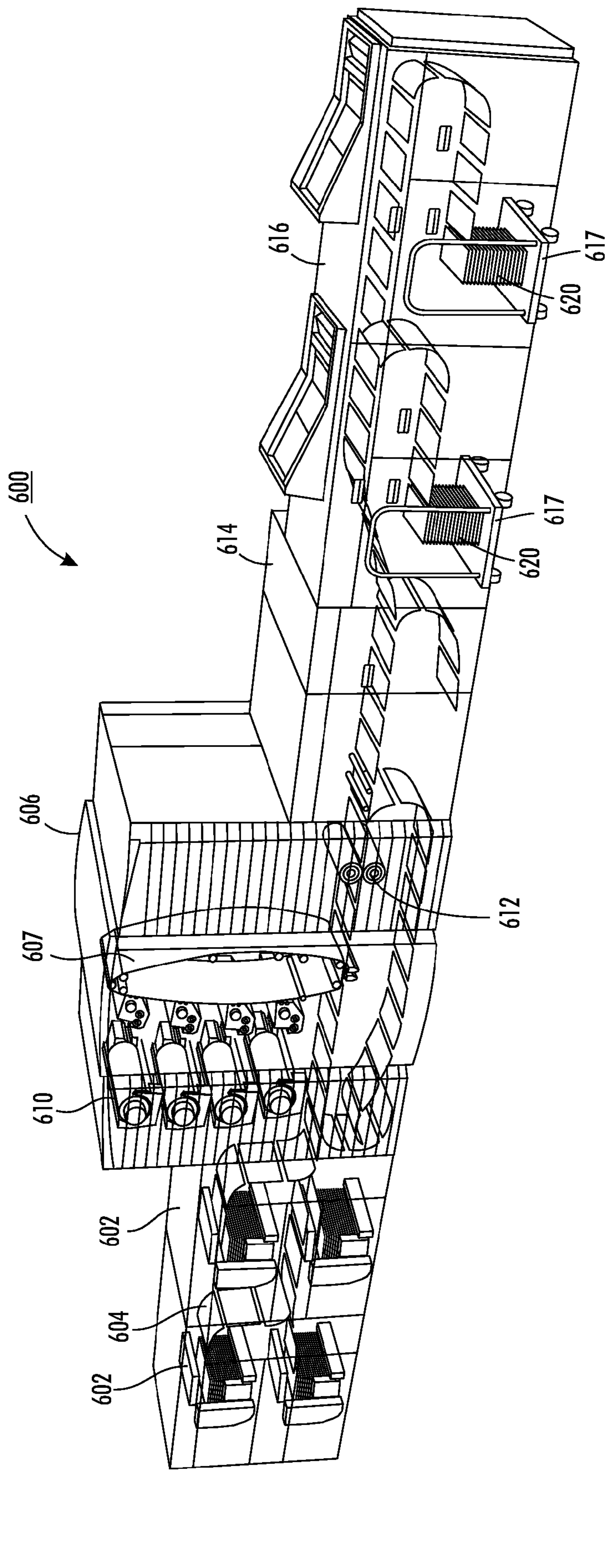
FIG. 6 illustrates an exemplary printing apparatus according to a possible embodiment.

FIG. 6 illustrates an exemplary printing apparatus 600, such as the apparatus 100. As used herein, the term "printing apparatus" encompasses any apparatus, such as a digital copier, bookmaking machine, multifunction machine, and other printing devices that perform a print outputting function for any purpose. The printing apparatus 600 can be used to produce prints from various media, such as coated, uncoated, previously marked, or plain paper sheets. The media can have various sizes and weights. In some embodiments, the printing apparatus 600 can have a modular construction. As shown, the printing apparatus 600 can include at least one media feeder module 602, a printer module 606 adjacent the media feeder module 602, an inverter module 614 adjacent the printer module 606, and at least one stacker module 616 adjacent the inverter module 614.

In the printing apparatus 600, the media feeder module 602 can be adapted to feed media 604 having various sizes, widths, lengths, and weights to the printer module 606. In the printer module 606, toner is transferred from an arrangement of developer stations 610 to a charged photoreceptor belt 607 to form toner images on the photoreceptor belt 607. The printer module 606 can include the apparatus 100 and the photosensitive surface 110 can be the surface on the photoreceptor belt 607. Also, one or multiple raster output scanners can be used in the printing apparatus 600. For example, a separate raster output scanner can be used for each developer station 610. The toner images are transferred to the media 604 fed through a paper path. The media 604 are advanced through a fuser 612 adapted to fuse the toner images on the media 604. The inverter module 614 manipulates the media 604 exiting the printer module 606 by either passing the media 604 through to the stacker module 616, or by inverting and returning the media 604 to the printer module 606. In the stacker module 616, printed media are loaded onto stacker carts 617 to form stacks 620.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An image forming apparatus comprising:

a photosensitive surface;

a raster output scanner including a first optical emitter configured to scan a first beam across the photosensitive surface and at least one second optical emitter configured to scan a second beam across the photosensitive surface to form an image on the photosensitive surface;

an integrated scan detector configured to detect the beams from the raster output scanner and configured to produce a signal based on the beams detected from the raster output scanner; and a beam calibration controller coupled to the integrated scan detector, the beam calibration controller configured to determine at least one beam delay between the first optical emitter and the at least one second optical emitter based on signals from the integrated scan detector, and configured to delay operation between the first optical emitter and the at least one second optical emitter based on the at least one beam delay, wherein the beam calibration controller is configured to determine at least one beam delay based on at least:

$$d_i = \frac{\sum_{j=1}^{N} \Delta c_{i,j} \cdot T_{CLK} \cdot f_{pix}}{N}$$

where i is a beam interval index corresponding to the total number of optical emitters, where $d_i$ is the delay corresponding to an $i^{th}$ optical emitter, where N is a number of samples, where $\Delta c_{i,j}$ is a difference between a time interval for the first beam and a time interval for an $i^{th}$ beam for the $j^{th}$ sample of the number of samples, where $T_{CLK}$ is an interval clock period, and where $f_{pix}$ is a pixel frequency for a given beam direction assembly speed.

2. The image forming apparatus according to claim 1, wherein the beam calibration controller is configured to alternately trigger the integrated scan detector between the first optical emitter as a reference first optical emitter and one of the at least one second optical emitter to determine the at least one beam delay.

3. The image forming apparatus according to claim 2, wherein the beam calibration controller is configured to alternately trigger the integrated scan detector between the first optical emitter as the reference first optical emitter and another of the at least one second optical emitter to determine a second beam delay for the another of the at least one second optical emitter.

4. The image forming apparatus according to claim 1, wherein the beam calibration controller is configured to determine the at least one beam delay by performing a delay determination operation including:

operating the raster output scanner to illuminate the integrated scan detector with the first beam from the first optical emitter, receiving a first signal from the integrated scan detector corresponding to the integrated scan detector detecting the first beam, operating the raster output scanner to illuminate the integrated scan detector with the second beam from a second optical emitter of the at least one second optical emitter, receiving a second signal from the integrated scan detector corresponding to the integrated scan detector detecting the second beam, and determining the at least one beam delay based on timing between receiving the first signal from the integrated scan detector and receiving the second signal from the integrated scan detector.

5. The image forming apparatus according to claim 4, wherein the beam calibration controller is configured to perform the delay determination operation multiple times to receive multiple samples to determine the at least one beam delay.

6. The image forming apparatus according to claim 4, wherein the beam calibration controller is configured to perform the delay determination operation for multiple pairs of optical emitters to determine the beam delay for additional optical emitters.

7. The image forming apparatus according to claim 1, wherein the beam calibration controller is configured to determine the at least one beam delay by:

illuminating the integrated scan detector with the first beam, scanning the first beam across the photosensitive surface until the first beam subsequently illuminates the integrated scan detector, determining a first time interval between the illumination and the subsequent illumination of the integrated scan detector by the first beam, scanning the second beam across the photosensitive surface until the second beam illuminates the integrated scan detector, determining a second time interval between the subsequent illumination of the integrated scan detector by the first beam and the illumination of the integrated scan detector by the second beam, and determining the at least one beam delay based on a difference between the first time interval and the second time interval.

8. The image forming apparatus according to claim 1, wherein the raster output scanner includes a rotating polygon coupled between the optical emitters and the photosensitive surface, the rotating polygon configured to sweep the plurality of beams across the photosensitive surface.

9. The image forming apparatus according to claim 1, wherein the raster output scanner comprises a plurality of vertical cavity surface emitting lasers arranged in an array, and wherein the first optical emitter comprises a first vertical cavity surface emitting laser and the at least one second optical emitter comprises at least one second vertical cavity surface emitting laser.

10. The image forming apparatus according to claim 1, further comprising an interval timer configured to count a number of interval timer cycles between the beams based on the signal from the integrated scan detector, wherein the beam calibration controller is configured to determine at least one beam delay between the first optical emitter and the at least one second optical emitter based on the number of interval timer cycles between the beams.

11. A method in an apparatus including a photosensitive surface, an integrated scan detector, a beam calibration controller, and a raster output scanner including a first optical emitter and at least one second optical emitter, the method comprising:

scanning a first beam from the first optical emitter across the photosensitive surface;

scanning a second beam from the at least one second optical emitter across the photosensitive surface;

detecting, by the integrated scan detector, the first beam from the first optical emitter and the second beam from the at least one second optical emitter;

producing a signal based on the beams detected from the raster output scanner by the integrated scan detector;

determining, by the beam calibration controller, at least one beam delay between the first optical emitter and the at least one second optical emitter based on signals from the integrated scan detector; and delaying operation between the first optical emitter and the at least one second optical emitter based on the at least one beam delay, wherein the beam calibration controller is configured to determine at least one beam delay based on at least:

$$d_i = \frac{\sum_{j=1}^{N} \Delta c_{i,j} \cdot T_{CLK} \cdot f_{pix}}{N}$$

where i is a beam interval index corresponding to the total number of optical emitters, where $d_i$ is the delay corresponding to an $i^{th}$ optical emitter, where N is a number of samples, where $\Delta c_{i,j}$ is a difference between a time interval for the first beam and a time interval for an $i^{th}$ beam for the $j^{th}$ sample of the number of samples, where $T_{CLK}$ is an interval clock period, and where $f_{pix}$ is a pixel frequency for a given beam direction assembly speed.

12. The method according to claim 11, further comprising alternately triggering the integrated scan detector between the first optical emitter as a reference first optical emitter and one of the at least one second optical emitter to determine the at least one beam delay for the one of the at least one second optical emitter.

13. The method according to claim 12, further comprising alternately triggering the integrated scan detector between the first optical emitter as the reference first optical emitter and another of the at least one second optical emitter to determine a second beam delay for the another of the at least one second optical emitter.

14. The method according to claim 11, wherein determining the at least one beam delay includes:

operating the raster output scanner to illuminate the integrated scan detector with the first beam from the first optical emitter;

receiving a first signal from the integrated scan detector corresponding to the integrated scan detector detecting the first beam;

operating the raster output scanner to illuminate the integrated scan detector with the second beam from a second optical emitter of the at least one second optical emitter;

receiving a second signal from the integrated scan detector corresponding to the integrated scan detector detecting the second beam; and determining the at least one beam delay based on timing between receiving the first signal from the integrated scan detector and receiving the second signal from the integrated scan detector.

15. The method according to claim 11, wherein determining the at least one beam delay includes operating the raster output scanner to illuminate the integrated scan detector with the beams and receiving the signals from the integrated scan detector a plurality of times to receive multiple samples to determine the at least one beam delay.

16. The method according to claim 11, wherein determining the at least one beam delay includes:

illuminating the integrated scan detector with the first beam;

scanning the first beam across the photosensitive surface until the first beam subsequently illuminates the integrated scan detector;

determining a first time interval between the illumination of the integrated scan detector by the first beam and the subsequent illumination of the integrated scan detector by the first beam;

scanning the second beam across the photosensitive surface until the second beam illuminates the integrated scan detector;

determining a second time interval between the subsequent illumination of the integrated scan detector by the first beam and the illumination of the integrated scan detector by the second beam; and determining the at least one beam delay based on a difference between the first time interval and the second time interval.

17. An image forming apparatus comprising:

a photosensitive surface;

a raster output scanner optically coupled to the photosensitive surface, the raster output scanner including a first optical emitter configured to scan a first beam across the photosensitive surface to form an image on the photosensitive surface, the raster output scanner including a plurality of second optical emitters including at least one second optical emitter configured to scan a second beam across the photosensitive surface to form an image on the photosensitive surface;

an integrated scan detector configured to detect the beams from the raster output scanner and configured to produce a signal based on the beams detected from the raster output scanner; and a beam calibration controller coupled to the integrated scan detector, the beam calibration controller configured to determine at least one beam delay between the first optical emitter and the at least one second optical emitter by operating the raster output scanner to illuminate the integrated scan detector with the first beam from the first optical emitter, receiving a first signal from the integrated scan detector corresponding to the integrated scan detector detecting the first beam, operating the raster output scanner to illuminate the integrated scan detector with the second beam from a second optical emitter of the plurality of second optical emitters, receiving a second signal from the integrated scan detector corresponding to the integrated scan detector detecting the second beam, and determining at least one beam delay for the second optical emitter based on a time between receiving the first signal from the integrated scan detector and receiving the second signal from the integrated scan detector and the beam calibration controller is configured to delay operation between the first optical emitter and the second optical emitter based on the at least one beam delay, wherein the beam calibration controller is configured to determine at least one beam delay based on at least:

$$d_i = \frac{\sum_{j=1}^{N} \Delta c_{i,j} \cdot T_{CLK} \cdot f_{pix}}{N}$$

where i is a beam interval index corresponding to the total number of optical emitters, where $d_i$ is the delay corresponding to an $i^{th}$ optical emitter, where N is a number of samples, where $\Delta c_{i,j}$ is a difference between a time interval for the first beam and a time interval for an $i^{th}$ beam for the $j^{th}$ sample of the number of samples, where $T_{CLK}$ is an interval clock period, and where $f_{pix}$ is a pixel frequency for a given beam direction assembly speed.

18. The image forming apparatus according to claim 17, wherein the beam calibration controller is configured to alternately trigger the integrated scan detector between pairings of the first optical emitter as a reference optical emitter and others of the plurality of the second optical emitters to determine a beam delay for each of the plurality of the second optical emitters.

* * * * *